(12) United States Patent
Lenk

(10) Patent No.: US 7,561,113 B2
(45) Date of Patent: Jul. 14, 2009

(54) ANTENNA SYSTEM FOR LEVEL MEASUREMENT WITH RADAR LEVEL MEASUREMENT DEVICES

(75) Inventor: Fritz Lenk, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 218 days.

(21) Appl. No.: 11/172,874

(22) Filed: Jul. 5, 2005

(65) Prior Publication Data
US 2006/0005621 A1    Jan. 12, 2006

(30) Foreign Application Priority Data
Jul. 7, 2004    (DE) .................. 10 2004 033 033

(51) Int. Cl.
*H01Q 1/22* (2006.01)
*H01Q 19/02* (2006.01)
*H01Q 19/01* (2006.01)

(52) U.S. Cl. .................. 343/772; 343/781 R; 343/761; 343/775; 343/779; 342/124; 342/17; 324/644

(58) Field of Classification Search ................ 343/772, 343/882, 775, 779, 781 R, 761; 324/644; 342/124, 17; 72/290
See application file for complete search history.

(56) References Cited

U.S. PATENT DOCUMENTS

| | | | | |
|---|---|---|---|---|
| 2,667,578 | A * | 1/1954 | Barnett et al. ................ | 343/863 |
| 4,070,678 | A * | 1/1978 | Smedes ....................... | 343/754 |
| 4,210,023 | A | 7/1980 | Sakamoto et al. ........... | 342/124 |
| 5,689,275 | A * | 11/1997 | Moore et al. ................ | 343/786 |
| 5,926,080 | A | 7/1999 | Palan et al. ................. | 324/642 |
| 5,926,152 | A * | 7/1999 | Schneider ................... | 343/915 |
| 6,469,676 | B1 * | 10/2002 | Fehrenbach et al. ......... | 343/786 |
| 6,538,598 | B1 | 3/2003 | Wilkie et al. ................ | 342/124 |

FOREIGN PATENT DOCUMENTS

| | | |
|---|---|---|
| DE | 2129290 | 11/1973 |
| DE | 28 12 871 | 10/1978 |
| DE | 41 00 922 C2 | 7/1992 |
| DE | 102 42 500 A1 | 3/2004 |
| EP | 0 444 834 A2 | 9/1991 |
| EP | 0 809 324 A2 | 11/1997 |
| JP | 62268201 | 11/1987 |
| JP | 2001066177 | 3/2001 |

\* cited by examiner

*Primary Examiner*—Douglas W Owens
*Assistant Examiner*—Jennifer F Hu
(74) *Attorney, Agent, or Firm*—The Nath Law Group; Jerald L. Meyer; Stanley N. Protigal

(57) ABSTRACT

The invention concerns an antenna system for level measurement with a level measurement device with a wave guide (5) that runs axially and that either has on its rear side an arrangement (4) for the generating and interpreting electromagnetic waves or can be connected to such an arrangement of an antenna, in particular, a parabolic antenna (1-3) on the front side of the wave guide and a wave adapter (9) for transmitting such a wave between two components of the arrangement that conduct the wave for adaptation of the wave transmission between the components, whereby the wave adapter has a through opening in the axial direction. Alternatively, or particularly preferred in combination, the invention concerns an antenna system for level measurement with a wave guide that runs axially, of an antenna, a fastening arrangement for fastening the wave guide to a wall of the vessel and a system of lines for conveying a medium, whereby system of lines (20-22, 24) is designed for supplying a cooling medium to components (2, 3) of the antenna that heat up.

17 Claims, 1 Drawing Sheet

ANTENNA SYSTEM FOR LEVEL MEASUREMENT WITH RADAR LEVEL MEASUREMENT DEVICES

BACKGROUND OF THE INVENTION

1. Field of the Invention

The invention concerns antenna systems for level measurement with a radar level measurement device.

2. Description of Related Art

Known from EP 1 058 341 A1 is a system made up of a wave guide for transmission of microwaves and an antenna at the front side end section of the wave guide. This system comprises a one-part component with an enlarged diameter at the front side end section that radiates the waves in the direction of the bulk material. While the wave guide with a smaller diameter is mono-modal, the front side section of the antenna with the larger diameter is capable of functioning in several modes. In the transmission area from the wave guide to the body of the antenna, a cross section adapter is employed in its cavity as a type of wave adapter. The cross section adapter is dimensioned in such a way that it does not permit the creation of any or only of an insignificant amount of higher modes than the base mode by the multi-modal antenna, and these are returned via the wave guide to a housing containing electronics for interpretation. The cross section adapter is constructed as a solid body from a dielectric solid body. In the direction of the front side, it projects tapered into the space of the antenna body. In the direction of the wave guide, the cross section adapter projects either tapered into the wave guide or as a blackbody with a flat transmission wall into the wave guide.

This arrangement makes it possible to transmit microwaves and/or radar waves from housing with suitable electronics, generally via a coaxial connector, a signal injection device, and the wave guide to the actual antenna. Horn, parabolic and rod antennas can be employed as antennas. In this arrangement, a section on the front side of the wave guide is at the same time constructed as a fastening element for fastening the overall system in a vessel wall. The fastening onto the wall of the vessel takes place in such a way that the antenna projects into the vessel in order to radiate microwaves and/or radar waves in the direction of a bulk material and to receive waves that are reflected by the surface of the bulk material in order to return them to the housing so that a level of the vessel can be determined.

Known from DE 197 03 346 A1 is a parabolic antenna for measuring the level in containers. For assembly and/or disassembly, the body of the parabolic antenna is constructed of individual antenna elements that can be pivoted towards the longitudinal axis of the arrangement, i.e., they can be folded up. As a result, when folded the parabolic antenna can be passed through a corresponding opening in the wall of the vessel. In this arrangement, a one-part antenna rod with a constant cross-section leads from a housing on the rear side that contains suitable electronics up to the end section on the front side on which a microwave transmitter and a microwave receiver are arranged. Waves that are fed via the antenna rod are transmitted from the microwave transmitter in the direction of the unfolded mirror body of the parabolic antenna in order to be radiated by the body of the antenna in the direction of the bulk material. Waves reflected by the bulk material are directed back to the microwave receiver by the body of the antenna and returned to the housing by the microwave receiver via the antenna rod.

In such an arrangement of a parabolic antenna with a flat body, large sections of which are aligned parallel to the surface of the bulk material, i.e. horizontal or nearly horizontal, the problem exists that dispersed bulk material remnants deposit on the antenna body.

Known from DE 197 03 346 A1 as a further feature is a cleaning device for cleaning the body of the parabolic antenna with compressed air or a cleaning fluid. Compressed air or a cleaning fluid is fed to jets, whereby the jets are directed toward the surface of the antenna and/or the mirror body via an inlet that runs parallel to the antenna rod as a self-contained component and is conducted through the overall system from the exterior area to the interior chamber of the vessel.

In many respects, this arrangement is complex in design because of the multitude of individual components and it also has a large exterior circumference.

BRIEF SUMMARY OF THE INVENTION

The object of the invention is to suggest an alternative and simple structure for a level measurement in an antenna system, in particular a level measurement device for a parabolic antenna. In particular, it should be possible to arrange the antenna body spaced from the vessel wall. The arrangement should preferably also make it possible to cool the individual elements.

This object is attained using a level measurement antenna system with the features of the present claims.

Accordingly, preferred in accordance with a first preferred embodiment type is a level measurement antenna system for a level measurement device with a wave guide that runs axially and that either has an arrangement on its rear side for generating and interpreting electromagnetic waves or can be connected to such an arrangement of an antenna, in particular a parabolic antenna on the front side of the wave guide and a wave adapter for transmitting such a wave between two components of the arrangement that conduct the wave for adaptation of the wave transmission between the components, whereby the wave adapter has an opening in the axial direction. The axial direction is understood to be the direction of propagation of the wave.

In accordance with an alternative, but in combination a particularly preferred type of embodiment, a level measurement antenna system is therefore advantageous for a level measurement device with a wave guide that runs axially and to the rear side of which an arrangement of an antenna for generating or interpreting electromagnetic waves is connected or can be connected, in particular a parabolic antenna on the front side of the wave guide, a fastening arrangement for fastening the arrangement, in particular the wave guide, to a wall of the vessel and a system of lines for conveying a medium, whereby the system of lines is designed for supplying a cooling medium to the components of the antenna that heat up.

Advantageous embodiments are subject of dependent claims.

Particularly advantageous is an arrangement in which the wave adapter is tapered, in particular conical, in the rear direction toward the through opening.

Particularly advantageous is an arrangement in which the wave adapter does not project over an end-face surface on the front side of the wave guide, in particular it is flush with the end-face surface.

Particularly advantageous is an arrangement in which the wave adapter is designed for adaptation of a wave transmission between the wave guide and a connecting piece and/or in the reverse direction.

Particularly advantageous is an arrangement in which the connecting piece is designed as wave guide and is dimensioned for spacing the antenna, in particular a parabolic antenna, from the interior wall of a vessel.

Particularly advantageous is an arrangement in which the through opening is hollow.

Particularly advantageous is an arrangement in which the system of lines for conveying the cooling medium to a transmitter and/or receiver and/or to an antenna rod of a parabolic antenna is designed as the antenna.

Particularly advantageous is an arrangement in which the system of lines leads from at least one inlet opening to be arranged on the exterior of a vessel wall to at least one outlet opening to be arranged on the interior of a vessel wall, particularly a jet.

Particularly advantageous is an arrangement in which the system of lines leads through the wall of at least one component of the arrangement that conducts the wave.

Particularly advantageous is an arrangement in which the conveying system of lines leads through a plurality of components of the arrangement that conduct the wave.

Particularly advantageous is an arrangement in which the cooling medium is gaseous, liquid, or fluid.

Particularly advantageous is an arrangement in which a fastening arrangement for fastening the level measurement antenna system, in particular the wave guide, is designed in such a way that the antenna can be pivoted relative to the vessel wall.

BRIEF DESCRIPTION OF THE SEVERAL VIEWS OF THE DRAWINGS

One exemplary embodiment will be explained in further detail with the aid of the drawings. Shown are.

DETAILED DESCRIPTION OF THE INVENTION

Figure 1:
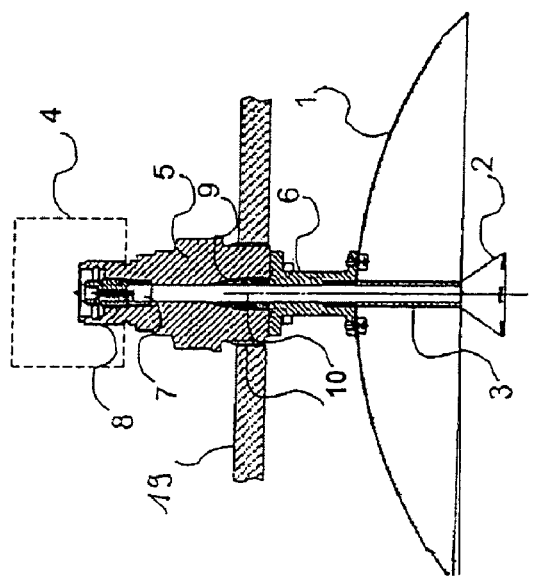
FIG. 1 A sectional representation through an antenna system of a level measurement antenna in accordance with a first embodiment.

FIG. 1 shows an example of an arrangement of a level measurement antenna with a parabolic antenna for transmitting and/or receiving electromagnetic waves, in particular radar waves or microwaves. The parabolic antenna comprises an actual antenna body, 1, an antenna rod, 3, and a device that is designed as a transmitter/receiver, 2. Antenna body, 1, comprises as known per se a parabolic mirror and has a central through opening. Antenna rod, 3, projects through the central through opening of the antenna body, 1, in the axial direction. The transmitter/receiver, 2, is located on the front side end of antenna rod, 3. Waves that are conducted to transmitter/receiver, 2, via antenna rod, 3, are directed towards antenna body, 1, by the transmitter/receiver, 2, and are radiated by it in frontal direction towards a bulk material in a vessel. Waves reflected by the bulk material in the opposite direction are bundled by antenna body, 1, to transmitter/receiver, 2, and then transmitted by it to antenna rod, 3, for further transmission.

Housing, 4, generates waves and/or interprets the waves received with appropriate electronic devices that are known per se. A wave guide, 5, transmits waves between housing, 4, and the antenna, 1, 2, 3, and on the front side end of it is attached a connecting element, 6, to or in the front side end of which antenna rod, 3 is affixed. A signal injection element, 7, and a coaxial connection, 8, transmit waves between housing, 4, and the wave guide, 5 in a manner known per se.

In order to enable correct, in particular a non-falsified transmission of waves between wave guide, 5, and/or the body thereof on the one hand, and the connecting element, 6, on the other hand, a wave adapter, 9, is arranged in the front side end section of wave guide, 5. Like wave guide, 5, the preferred wave adapter, 9, has an axial through opening, 10, that extends with preferably the same opening cross-section through wave guide, 5, wave adapter, 9, connecting element, 6, and antenna rod, 3. The wave adapter, 9, preferably has conical progression, at least in part, whereby the wave adapter, 9, is designed in the rear direction, i.e. in the direction of housing, 4, conically tapered toward through opening, 10. The front side end of wave adapter, 9, is preferably flat and flush with the flat end section on the front side of wave guide, 5, and/or its body. Customarily, wave adapter, 9, comprises a dielectric material and is dimensioned in such a way that the waves are transmitted in an undisturbed manner in spite of the different transmission material of wave guide, 5, and connecting element, 6, and/or a different diameter and a different shape of the body of the wave guide, 5, and connecting element, 6.

If the axial through opening, 10, is filled by the component adjacent to wave adapter, 9, with a medium, in particular a dielectric, the section of the through opening, 10, in the area of the wave adapter can optionally also be filled with this material, whereby the medium will generally have other physical characteristics than the material of wave adapter, 9. However, it is also possible to use another medium within wave adapter, 9, or no medium at all, i.e. air or vacuum.

Embodied at the lateral circumference of the wave guide, 5, in its front side section is a fastening option for fastening the wave guide, 5, in a through opening of a vessel. In the exemplary embodiment illustrated this is a thread, 11, that can be screwed into a corresponding counter-thread of the through opening of a wall, 19, of the vessel. In its assembled condition, the connecting element, 6, thus projects into the interior of the vessel and thus spaces antenna body, 1, from an inner wall of the vessel.

Figure 2:
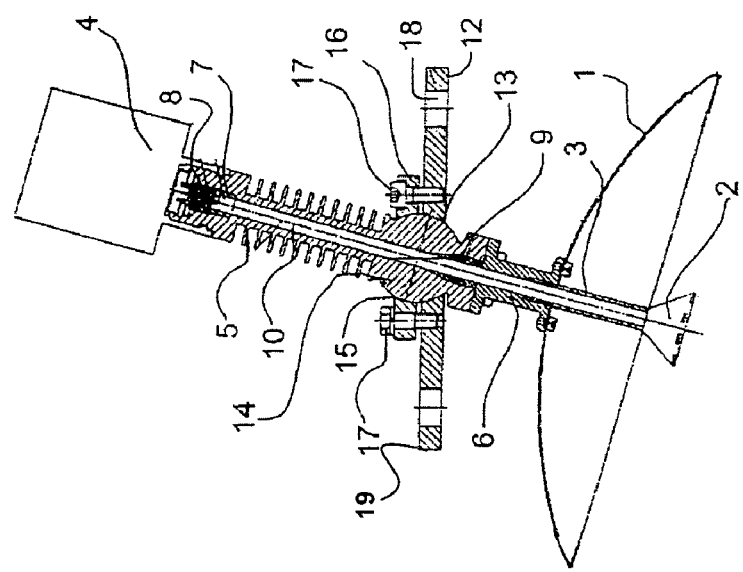
FIG. 2 A sectional representation through a level measurement antenna in accordance with a second embodiment.

A second exemplary embodiment is described with the aid of FIG. 2. The significant difference with respect to the arrangement shown in FIG. 1 is that the overall system can be pivoted relative to an opening of the vessel. Because of this, a longitudinal axis of the overall system can therefore be displaced and/or pivoted relative to the walls of the vessel, 19, in order to be able to adapt the antenna as well as possible to a filling condition of the vessel. The overall system of the radar level measurement device again comprises a housing, 4, that contains components for generating signals and for signal interpretation. The housing, 4, is mounted on the actual antenna system. The antenna system again has a wave guide, 5, whose front-side body is spherical on the outside, i.e. it is designed as a spherical piece, 14. Again, a through opening, 10, extends through the entire body of the wave guide, 5, including the area of the spherical piece, 14, and a wave adapter, 9, on the front side. As in the other embodiments, the cross-section of the axial through opening, 10, can be in particular round or rectangular. A radar signal is introduced from housing, 4, via a coaxial connection, 8, and a signal injection device, 7, into the body of wave guide, 5, and is transmitted by it in the frontal direction. Again arranged on the front side of the body of the wave guide, 5, is a connecting piece, 6, whereby transmission between the connecting piece, 6, and the wave guide, 5, is in turn adapted through a wave adapter, 9, that is inserted at the front side into the body of wave guide, 5. Again, inserted at the front side into connecting piece, 6, is an antenna rod, 3, that terminates in a radar wave transmitter/receiver, 2. Transmitter/receiver, 2, is located at the focal point of the parabolic antenna, 1, and radiates the radar signal to the interior of the actual body of parabolic antenna, 1. This reflects the radar wave/the signal formed by the radar wave parallel to the longitudinal axis, in particular the center axis of wave guide, 5, in the direction of the bulk material surface, from which a portion of the signal returns as echo and is fed back to the interpretation electronics in housing, 4, in reverse via parabolic antenna, 1, the transmitter/receiver, 2, the antenna rod, 3, the connecting piece, 6, wave adapter, 9, and wave guide, 5.

If the bulk material surface runs on an incline to the wall, 19, of the vessel in which the antenna system is attached, or the attachment pieces of the antenna system and/or the radar level measuring device are affixed at an incline, as is the case for example with a domed vessel cover, the echo is partially or completely reflected away from parabolic antenna, 1, so that no or only a poor measurement is possible. By pivoting the overall system or the longitudinal axis about spherical piece, 14, the longitudinal axis can be aligned in such a way that it is directed at a bulk material surface that runs perpendicular to it. Using a spherical piece 14 advantageously enables sufficient conical pivoting of the longitudinal axis of the antenna system about the center of the sphere. The front-side surface of the spherical piece, 14, can be borne directly in a conical through opening of the vessel wall that is adapted to the spherical shape. Particularly preferred is an embodiment in which the spherical piece, 14, is arranged in a through opening, 13, of a flange, 12. For bracing the spherical piece, 14, in this through opening, 13, a bracing flange, 16, is used that also has a corresponding through opening, 15, the opening wall is adapted to the rear surface characteristics of spherical piece, 14. For example, bracing flange, 16, is screwed to flange, 12, by means of screws, 17. If the front side of the spherical piece, 14, is used directly in a correspondingly shaped through opening of the vessel wall, bracing flange, 16, is clamped directly against the vessel wall. In the exemplary embodiment depicted with a flange, 12, flange, 12, advantageously has through openings, 18, through which additional screws can be screwed for fastening flange, 12, on the upper side of a corresponding through opening of the vessel wall. By means of bracing flange, 16, and if appropriate, an interposing O-ring for sealing, the spherical part, 14, and above it the entire antenna system can be fixed in an optimal position. Depending on the tension of the bracing flange, 16, the antenna system remains pivotable in the installed condition or can be fixed in a desired position.

In particular, in an arrangement of this type with a pivotable antenna, in particular, parabolic antenna, 1, use of the connecting piece, 6, is advantageous in order to sufficiently space the body of the parabolic antenna, 1, from the vessel wall, so that the body of the parabolic antenna, 1, does not strike the interior vessel wall when the entire antenna system is pivoted. In order to enable undisturbed transmission of the waves from the wave guide, 5, to the connecting piece, 6, and in the reverse direction, the wave guide adapter, 9, is suitably adapted depending on the connecting piece, i.e. in particular with respect to its material and shape as well as its dimension.

Use of such a wave guide adapter, 9, also enables use of components such as wave guide, 5, for another type of antenna, for example, a horn antenna, for use in a parabolic antenna, 1, without having to completely re-design the other components such as the wave guide, 5. Thus, wave guide adapter, 9, enables modular construction of an antenna system, which in addition to the use of a horn antenna also enables the use of a parabolic antenna, [[#]] 1, ultimately on any other component of a modular system.

The connecting piece, 6, preferably comprises a rod-shaped body with a flange at each end section, whereby the flange has bores/through openings for passing through and screwing in screws. Because of that, the connecting piece, 6, on a facing side of a correspondingly designed body of wave guide, 5, can be screwed in on the one side and at a corresponding area of parabolic antenna, 1, on the other side. In particular, this makes it possible to use variously dimensioned connecting pieces, 6, particularly with various lengths. In a modular system, the two face-side end sections of connecting pieces, 6, are adapted to correspondingly shaped counter-pieces of wave guides, 5 and antennas, 1. Preferably, the antenna rod, 3, is also provided in a plurality of dimensions, so that it is possible to adapt for instance parabolic antennas, 1, of various sizes. Preparing various separation options for connecting piece, 6, and antenna rod, 3, makes it possible in particular to assemble and pass through small bores in a vessel wall, and to assemble the parabolic antenna, 1, from below or from the inside of the vessel.

Figure 3:
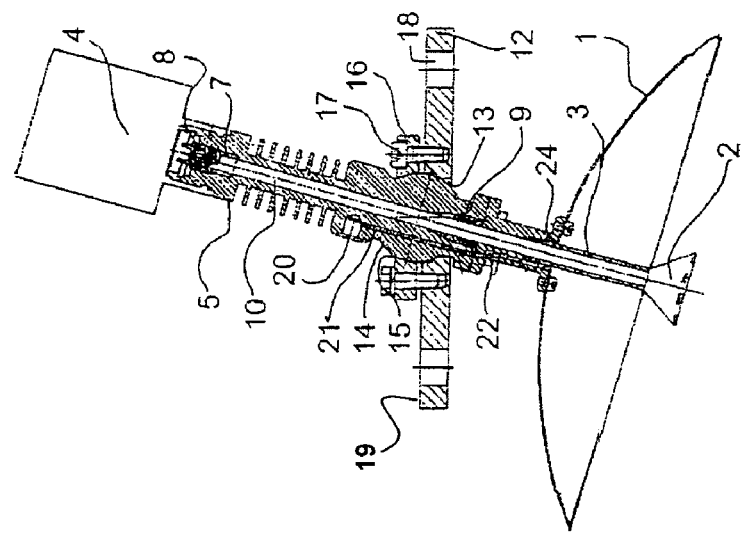
FIG. 3 A sectional representation through an embodiment of a level measurement antenna with a line configuration for supplying a cooling and/or cleaning agent from a vessel exterior to the actual antenna body.

FIG. 3 shows an alternate embodiment to the arrangement shown in FIG. 2. In addition to the components that are shown, a system of lines is embodied in the body of the wave guide, 5, and connecting piece, 6, which permits a liquid and/or gaseous medium for cooling and/or for cleaning to flow to the actual antenna from the outside of the vessel.

A corresponding supply element for the medium can be connected to a rinse connection, 20. One or more lines, 21, begin in the rinse connection, 20, and run parallel through the body of wave guide, 5, to the axial through opening, 10, and preferably terminate open on the face on the front-side end section. The connecting piece, 6, also has one or a plurality of corresponding lines, 22, that lead to its front area. There are several jets in this front area, in particular an annular jet, 24, that permits the medium to escape from the rear side and/or the front side of the parabolic antenna, 1. In particular, an escape towards the front side of parabolic antenna, 1, through a through opening that has a larger inner diameter than the outer diameter of the antenna rod, 3, directs the medium in the direction of the transmitter/receiver, 2, in order to cool and/or clean it. An arrangement of this type thus makes possible in a simple manner that also saves space cooling or, if appropriate, cleaning of the antenna and the components that become very hot when microwaves and radar waves are used for such a level measurement antenna. Alternatively, the system of lines can also be made of self-contained lines in addition to, for example, the wave guide.

The heat of transmitter, 2, which becomes very hot during transmission, is thus already cooled where it occurs so that the heat that is created cannot spread to the other components in the direction of the housing, 4, that contains the electronics. Through the location of a ring jet, 24, not only the transmitter, 2, is cooled in a targeted way, but also the corresponding antenna rod, 3, is cooled by being rinsed with the medium, which effects a further reduction in the transmitted heat in the direction of the housing, 4, at the rear. In addition to a reduction in heat, such a cooling mechanism as well as a corresponding well-dimensioned wave adapter, 9, also lead to only small losses in performance.

If individual components are described with regard to a certain exemplary embodiment, this is not meant in a limiting sense but is merely by way of example. Advantageously, the various components of the individually depicted embodiments can be exchanged for one another and they can also be combined with other suitable components for known antenna systems.

The invention claimed is:

1. Level measurement antenna system for a level measurement device, the antenna system comprising:
   a wave guide that runs axially and that either has an arrangement on its rear side for generating and interpreting electromagnetic waves or can be connected to such an arrangement;
   an antenna on the front side of the wave guide;
   a connecting piece fixed on one end with the antenna and on another end with a spherical piece, so that the antenna can be turned; and
   a wave adapter within the spherical piece and flush with an end-phase surface of the spherical piece for transmitting such a wave between two components of the arrangement that conduct the wave for adaptation of the wave transmission between the components, the wave adapter tapered in the rear direction towards the through opening,
   wherein the wave adapter has a through opening in the axial direction and does not project over an end-face surface on the front side of the wave guide, and
   wherein the antenna comprises a rod that ends within the connecting piece.

2. The antenna system of claim 1, wherein
   the wave adapter is designed for the adaptation of a wave transmission between the wave guide and the connecting piece and/or in the reverse direction.

3. The antenna system of claim 2, wherein
   the connecting piece is dimensioned for spacing the antenna from an interior wall of a vessel.

4. The antenna system of claim 1, wherein
   the through opening is hollow.

5. The system of claim 1, the system further comprising
   a fastening arrangement for fastening wave guide to a vessel wall, and
   a system of lines for conveying a medium,
   wherein the system of lines supplies a cooling medium to components of the antenna that heat up.

6. The antenna system of claim 5, wherein
   the system of lines are at least partially comprised by the antenna.

7. The antenna system of claim 5, wherein
   the system of lines leads from at least one inlet opening on an exterior of the vessel wall to at least one outlet opening on an interior of the vessel wall.

8. The antenna system of claim 7, wherein
   the system of lines leads through a plurality of components of the arrangement that conduct the wave.

9. The antenna system of claim 5, wherein
   the system of lines leads through the wall of at least one component of the system that conducts the wave.

10. The antenna system of claim 5, wherein
    the cooling medium is gaseous, liquid, or fluid.

11. The antenna system of claim 5, wherein
    the fastening arrangement is designed in such a way that the antenna can be pivoted relative to the vessel wall.

12. The system of claim 5, the system further comprising
    the pivoting permitting alignment of the antenna to direct the antenna at a bulk material surface.

13. The system of claim 12, the system further comprising
    at least one line for conveying a rinse medium, and
    at least one jet in a front area of the antenna connected to the line conveying the rinse medium and permitting the rinse medium to escape toward the front side of the antenna to direct the medium in the direction of the transmitter/receiver, 2, in order to cool and/or clean it.

14. The system of claim 1, the system further comprising
    at least one line for conveying a rinse medium, and
    at least one jet in a front area of the antenna connected to the line conveying the rinse medium and permitting the rinse medium to escape toward the front side of the antenna to direct the medium in the direction of the transmitter/receiver, 2, in order to cool and/or clean it.

15. The system of claim 1, the system further comprising
    a system of lines for conveying a medium, wherein the system of lines supplies a cooling medium to components of the antenna that heat up,
    a line conveying a rinse medium,
    at least one jet in a front area of the antenna connected to the line conveying the rinse medium and permitting the rinse medium to escape toward the front side of the antenna to direct the medium in the direction of the transmitter/receiver, in order to clean it.

16. The system of claim 15, further comprising the system of lines carrying the cooling medium and the line carrying the rinse medium provided as a single medium.

17. The system of claim 1, further comprising the antenna constructed as a parabolic antenna.

* * * * *